United States Patent [19]

Sakamoto et al.

[11] Patent Number: 5,415,928
[45] Date of Patent: May 16, 1995

[54] MAGNETIC RECORDING TAPE

[75] Inventors: Hiroshi Sakamoto, Osaka; Takeshi Matsuura, Kyoto; Shinjyo Higashino, Shiga; Hirotaka Kawamura, Kyoto, all of Japan

[73] Assignee: Hitachi Maxell, Ltd., Osaka, Japan

[21] Appl. No.: 8,846

[22] Filed: Jan. 25, 1993

Related U.S. Application Data

[63] Continuation of Ser. No. 580,649, Sep. 11, 1990, abandoned.

[30] Foreign Application Priority Data

Sep. 16, 1989 [JP] Japan .................................. 1-240445

[51] Int. Cl.$^6$ ................................................ G11B 5/00
[52] U.S. Cl. ......................................... 428/323; 428/329; 428/336; 428/694 B; 428/694 BR; 428/694 BA; 428/900
[58] Field of Search ................ 428/329, 694, 900, 336, 428/694 B, 694 BR, 694 BA, 323

[56] References Cited

U.S. PATENT DOCUMENTS

| | | | |
|---|---|---|---|
| 4,547,425 | 10/1985 | Naruse | 428/694 |
| 4,731,278 | 3/1988 | Ryoke et al. | 428/694 |
| 4,748,080 | 5/1988 | Itozawa | 428/694 |
| 4,803,132 | 2/1989 | Kishimoto et al. | 428/141 |
| 4,857,417 | 8/1989 | Kitaoka et al. | 428/694 |

*Primary Examiner*—Paul J. Thibodeau
*Assistant Examiner*—Leszek Kiliman

[57] ABSTRACT

A magnetic recording tape comprising a nonmagnetic substrate and a magnetic layer which is formed on at least one surface of the substrate, the magnetic layer comprising a magnetic powder and a binder resin having a surface resistivity of not larger than $1 \times 10^9$ Ω/sq. cm and a thickness of not larger than 3.5 μm, the magnetic recording tape having a light transmittance of not larger than 0.8% and a residual magnetic flux density of at least 1400 G, which has good light shielding, and reproduction output characteristics, a small number of dropouts and improved touch with a magnetic head.

2 Claims, No Drawings

MAGNETIC RECORDING TAPE

This application is a continuation of application Ser. No. 07/580,649 filed on Sep. 11, 1990, now abandoned.

BACKGROUND OF THE INVENTION

1. Field of the Invention

The present invention relates to a magnetic recording tape. More particularly, the present invention relates to a magnetic recording tape having improved reproduction output characteristics, dropout and touch with a magnetic head.

2. Description of the Related Art

A magnetic recording medium such as a magnetic recording tape is usually produced by applying a magnetic paint comprising a magnetic powder and a binder resin on a substrate, such as a polyester film. To decrease the coefficient of friction of a magnetic layer, light transmittance and to reduce electric resistance, in order to prevent electrostatic charge build-up, carbon black is added to the magnetic layer.

With recent progress in high density recording and high performance of the magnetic recording medium, as one of the measures for increasing the output of the magnetic recording tape which uses magnetic iron oxide powder, the amount of carbon black in the magnetic layer is decreased so as to increase the content of the magnetic iron oxide powder in the magnetic layer.

However, when the amount of carbon black in the magnetic layer is decreased, the light shielding effect is deteriorated, so that a tape end may not be well detected with an optical sensor in the VHS video system, which may cause malfunction of the system. If the thickness of the magnetic layer is increased to prevent such a malfunction, a touch of the magnetic layer with a magnetic head, in particular in an EP mode, is worsened and envelope failure may be induced. Further, decrease of the carbon black content increases electric resistance of the magnetic layer and in turn the number of dropouts caused by absorption of dust due to the pressure of electrostatic charge.

SUMMARY OF THE INVENTION

One object of the present invention is to provide a magnetic recording tape having sufficient light shielding for preventing malfunction of a recording and reproducing machine, such as a video deck, while improving envelope in the EP mode.

Another object of the present invention is to provide a magnetic recording tape having decreased dropout which is caused, for example, by absorbed dust, and therefore increased output.

According to the present invention, there is provided a magnetic recording tape comprising a nonmagnetic substrate and a magnetic layer which is formed on at least one surface of the substrate, the magnetic layer comprising a magnetic powder and a binder resin having a surface resistivity of not larger than $1 \times 10^9$ $\Omega$/sq. cm and a thickness of not larger than 3.5 $\mu$m, and the magnetic recording tape having a light transmittance of not larger than 0.8% and a residual magnetic flux density of at least 1400 G.

DETAILED DESCRIPTION OF THE INVENTION

As the magnetic powder to be contained in the magnetic layer according to the present invention, cobalt-coated iron oxide powder containing at least 6.0% by weight of $Fe^{2+}$ based on the whole weight of the magnetic powder is preferably used. Since the cobalt-coated iron oxide powder having such a high $Fe^{2+}$ content has good light shielding and electric conductivity, the magnetic layer comprising such cobalt-coated iron oxide powder has a sufficient light shielding effect and well decreased electric resistance, such that the dropout is greatly decreased. Even at a thinner thickness, the magnetic layer has sufficient light shielding effect, and the EP mode envelope becomes good. Since the cobalt-coated iron oxide powder having high $Fe^{2+}$ content has large saturation magnetization, the residual magnetic flux density of the magnetic recording tape is sufficiently increased due to increase of the saturation magnetization, so that the reproduction output of the magnetic recording tape is significantly improved.

Preferred examples of the cobalt-coated iron oxide powder containing at least 6% by weight of $Fe^{2+}$ are $\gamma$-$Fe_2O_3$ powder particles which are coated with cobalt, $Fe_3O_4$ or intermediate oxide of $Fe_3O_4$ powder particles which are coated with cobalt, and a mixture of the $Fe_3O_4$ or intermediate of $Fe_3O_4$ powder particles which are coated with cobalt and the $\gamma$-$Fe_2O_3$ powder particles which are coated with cobalt. In this mixture of the iron oxide powders, the content of the former is preferably at least 20% by weight.

The thickness of the magnetic layer comprising such iron oxide powder is not larger than 3.5 $\mu$m, since when the thickness is larger than 3.5 $\mu$m, stiffness of the magnetic tape is such that onset of the EP mode envelope is worsened. The thickness of the magnetic layer is preferably about 3.3 $\mu$m, more preferably from 2.9 to 3.2 $\mu$m.

The light transmittance through the magnetic recording tape, which is measured by using a tungsten lamp with a color temperature of 2000 K as a light source and a silicon diode ($\lambda_p$=870 mm) as a photoreceptor, is preferably not larger than 0.8%, since when it exceeds 0.8%, the recording and reproducing machine tends to malfunction.

When the surface resistivity of the magnetic recording medium exceeds $1 \times 10^9$ $\Omega$/sq. cm, the number of dropouts increases due to the adhesion of dust. Then, it is preferred to decrease the surface resistivity of the magnetic recording tape to $1 \times 10^9$ $\Omega$/sq. cm or less by using the cobalt-coated iron oxide powder, containing at least 6.0% by weight of $Fe^{2+}$, in a specific amount.

The residual magnetic flux density of the magnetic recording tape is at least 1400 G. If it is less than 1400 G, sufficiently high output cannot be achieved. Preferably, the residual magnetic flux density is from 1500 to 2000 G.

To satisfy the above requirements of the present invention, the cobalt-coated iron oxide powder containing at least 6.0% by weight of $Fe^{2+}$ is used in an amount of 70 to 90% by weight based on the weight of the magnetic layer.

When carbon black in used in a small amount together with the cobalt-coated iron oxide powder containing at least 6.0% by weight of $Fe^{2+}$, the light transmittance and the surface resistivity are further improved. As carbon black, any carbon black that is used in a conventional magnetic recording medium can be used. Preferably, Vulcan XC-72 and Black Pearl (manufactured by Cabot), Laben 2000 and 1255 (manufactured by Columbia Carbon), and #4010 BS (manufactured by Mitsubishi Kasei) are used. Carbon black is used in an amount of 1.0 to 3.0% by weight based on the weight of the magnetic powder in the magnetic layer.

The magnetic recording tape of the present invention may be produced by any conventional method. For example, the cobalt-coated iron oxide powder containing at least 6.0% by weight of $Fe^{2+}$ is mixed with the binder resin, an organic solvent and other additives, such as carbon black, to prepare a magnetic paint. The magnetic paint is applied on at least one surface of the substrate by any conventional method, such as spraying or roll coating, and dried. Then, the substrate bearing the magnetic layer(s) is cut to a suitable width.

The binder resin may be any conventional binder such as vinyl chloride-vinyl acetate copolymer, cellulose resin, polyurethane resin, nitrile-butadiene rubber, styrene-butadiene rubber, polyesterpolyamide, polyisocyanate and the like.

The organic solvent also may be any of the conventional ones such as methyl isobutyl ketone, cyclohexanone, ethyl acetate, tetrahydrofuran, dioxane, toluene, xylene and mixtures thereof.

The magnetic paint may contain at least one conventional additive such as an abrasive (e.g. $Cr_2O_3$, $Al_2O_3$, etc.), a dispersant, and the like.

On one surface of the substrate, a single magnetic layer is formed, although two or more magnetic layers may be laminated.

PREFERRED EMBODIMENTS OF THE INVENTION

The present invention will be illustrated by following Examples, in which "parts" and "%" are by weight unless otherwise indicated.

EXAMPLE 1

The following components were mixed and dispersed in a high speed mixer for 5 to 10 hours and further dispersed in a grinder:

| Component | Parts |
| --- | --- |
| Co-coated $\gamma$-$Fe_2O_3$ powder containing 6.0% of $Fe^{2+}$ | 100 |
| Vinyl chloride-vinyl acetate-vinyl alcohol copolymer (VAGH manufactured by U.C.C.) | 56.3 |
| $\alpha$-$Al_2O_3$ (av. particle size: 0.2 $\mu$m) | 6.0 |
| Carbon black (Vulcan XC-72 manufactured by Cabot) | |
| Zinc stearate | 0.5 |
| Cyclohexanone | 90 |
| Toluene | 90 |

To the resulting mixture, the following components were added in an arbitrary order and well mixed and dispersed in a high speed mixer to prepare a magnetic paint:

| Component | Parts |
| --- | --- |
| Polyurethane resin (20% solution) | 40 |
| Trifunctional low molecular weight isocyanate compound (70% solution) | 4 |
| Myristic acid | 0.15 |
| Cyclohexanone | 35 |
| Toluene | 35 |

The magnetic paint was filtered through a filter with a nominal pore size of 1 $\mu$m and coated on a surface of a polyester film having a nominal thickness of 14 $\mu$m to a thickness of 3.5 $\mu$m after drying, followed by calendering to form a magnetic layer.

On the back of the polyester film having the already formed magnetic layer, a back coating paint containing particle components (e.g. an abrasive and an antistatic agent), a binder resin and an organic solvent was coated and dried to form a back coating having a dry thickness of 0.8 $\mu$m. Then, the film was cut to a width of ½ inch to obtain a video tape.

EXAMPLE 2

In the same manner as in Example 1 but using cobalt-coated $Fe_3O_4$ powder containing 12.0% by weight of $Fe^{2+}$ in place of the cobalt-coated $\gamma$-$Fe_2O_3$ powder containing 6.0% by weight of $Fe^{2+}$ and changing the thickness of the magnetic layer from 3.5 $\mu$m to 3.0 $\mu$m, a video tape was produced.

EXAMPLE 3

In the same manner as in Example 1 but using a mixture of cobalt-coated $Fe_3O_4$ powder containing 12.0% by weight of $Fe^{2+}$ and cobalt-coated $\gamma$-$Fe_2O_3$ powder containing 4.0% by weight of $Fe^{2+}$, in a weight ratio of 1:1, in place of the cobalt-coated $\gamma$-$Fe_2O_3$ powder containing 6.0% by weight of $Fe^{2+}$, and changing the thickness of the magnetic layer from 3.5 $\mu$m to 3.2 $\mu$m, a video tape was produced.

COMPARATIVE EXAMPLE 5

In the same manner as in Example 1 but using a mixture of cobalt-coated $Fe_3O_4$ powder containing 15.0% by weight of $Fe^{2+}$ and cobalt-coated $\gamma$-$Fe_2O_3$ powder containing 5.0% by weight of $Fe^{2+}$ in a weight ratio of 1:4, in place of the cobalt-coated $\gamma$-$Fe_2O_3$ powder containing 6.0% by weight of $Fe^{2+}$, using no carbon black and changing the thickness of the magnetic layer from 3.5 $\mu$m to 3.2 $\mu$m, a video tape was produced.

COMPARATIVE EXAMPLE 1

In the same manner as in Example 1, but changing the thickness of the magnetic layer from 3.5 $\mu$m to 2.5 $\mu$m, a video tape was produced.

COMPARATIVE EXAMPLE 2

In the same manner as in Example 1, but using cobalt-coated $\gamma$-$Fe_2O_3$ powder containing 4.0% by weight of $Fe^{2+}$ in place of the cobalt-coated $\gamma$-$Fe_2O_3$ powder containing 6.0% by weight of $Fe^{2+}$, a video tape was produced.

COMPARATIVE EXAMPLE 3

In the same manner as in Example 1, but changing the thickness of the magnetic layer from 3.5 $\mu$m to 3.6 $\mu$m, a video tape was produced.

COMPARATIVE EXAMPLE 4

In the same manner as in Example 1, but changing the amount of carbon black from 1.0 part to 4.0 parts and the thickness of the magnetic layer from 3.5 $\mu$m to 3.0 $\mu$m, a video tape was produced.

With each of the video tapes produced in the Examples and Comparative Examples, light transmittance, surface resistivity, residual magnetic flux density, the number of dropouts, evenness of envelope, RF output and chroma output were measured.

The light transmittance was measured by using a tungsten lamp with a color temperature of 2000 K as a light source and a silicon diode ($\lambda_p = 870$ mm) as a photoreceptor.

The number of dropout of 15 μs in width and 20 dB in depth was counted with a dropout counter by traveling the video tape in a VTR standard mode in the VHS system for 60 minutes.

The evenness of envelope was measured as follows:

The video tape was played back in the VTR EP mode in the VHS system and the RF output signal was observed with an oscilloscope. Then, the evenness of envelope was calculated according to the equation: 20 $\log_{10} A/B$ in which A is an amplitude at a middle part of one trace of one video head and B is an amplitude at a switching part.

The RF output and the chroma output were obtained by measuring them in the VTR standard mode in the VHS system and comparing them with those of a reference tape.

With the video tape produced in Comparative Example 1, the traveling of the tape was stopped due to malfunction, and the number of dropout, the evenness of envelope, the RF output and the chroma output were not measured.

The results are shown in the Table.

TABLE

| Example No. | Light transmittance (%) | Surface resistivity (Ohm/sq.) | Residual magnetic flux density (G) | Number of dropouts per 60 min. | Evenness of envelope (dB) | RF output (dB) | Chroma output (dB) |
|---|---|---|---|---|---|---|---|
| 1 | 0.4 | $8.5 \times 10^8$ | 1400 | 2 | −2.2 | +1.3 | +1.2 |
| 2 | 0.2 | $7.0 \times 10^8$ | 1570 | 1 | −1.7 | +2.0 | +2.2 |
| 3 | 0.4 | $8.0 \times 10^8$ | 1520 | 1 | −2.0 | +1.7 | +1.9 |
| 4 | 0.5 | $1.0 \times 10^9$ | 1490 | 2 | −2.0 | +1.7 | +1.7 |
| Comp. 1 | 1.2 | $9.0 \times 10^9$ | 1405 | — | — | — | — |
| Comp. 2 | 0.8 | $7.0 \times 10^9$ | 1400 | 11 | −2.4 | +1.2 | +1.2 |
| Comp. 3 | 0.1 | $8.0 \times 10^8$ | 1435 | 3 | −4.5 | +1.3 | +1.2 |
| Comp. 5 | 0.1 | $2.0 \times 10^8$ | 1390 | 1 | −2.0 | +0.9 | +0.7 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording tape comprising a nonmagnetic substrate and a magnetic layer which is formed on at least one surface of said substrate, and magnetic layer comprising of a cobalt-coated iron oxide magnetic powder mixture containing at least 6% by weight of $Fe^{2+}$, said magnetic powder mixture being 70% to 90% by weight based on the weight of said magnetic layer, said magnetic powder mixture consisting of $Fe_3O_4$ powder particles or intermediate oxide of $Fe_3O_4$ powder particles coated with cobalt and $\gamma$-$Fe_2O_3$ powder particles coated with cobalt, a binder and 1 to 3% by weight of carbon black based on the weight of the magnetic powder, said magnetic layer having a surface resistivity of not larger than $1 \times 10^9$ Ω/sq. cm and a thickness of not larger than 3.5 μm, said magnetic recording tape having a light transmittance of not larger than 0.8% and a residual magnetic flux density of at least 1400 G.

2. The magnetic recording tape according to claim 1, wherein the content of said $Fe_3O_4$ or intermediate oxide of $Fe_3O_4$ powder particles coated with cobalt in said mixture is at least 20% by weight of said mixture.

* * * * *